United States Patent [19]
Yeh

[11] Patent Number: 6,129,813
[45] Date of Patent: Oct. 10, 2000

[54] MACHINE FOR FUSING PLASTIC PLATES WITH A GUIDING/POSITIONING FUNCTION

[76] Inventor: Ten-Fu Yeh, No. 53, Alley 87, Lane 538, An-Ho Rd., Sec. 4, Tainan, Taiwan

[21] Appl. No.: 09/264,492

[22] Filed: Mar. 8, 1999

[51] Int. Cl.$^7$ ..................................................... B32B 31/00
[52] U.S. Cl. ........................ 156/512; 156/304.6; 156/499; 156/507; 156/558
[58] Field of Search .............................. 156/304.1, 304.5, 156/304.6, 499, 502, 507, 512, 558

[56] References Cited

U.S. PATENT DOCUMENTS

| | | | |
|---|---|---|---|
| 4,552,602 | 11/1985 | Landsness | 156/304.1 |
| 4,743,412 | 5/1988 | Kuse | 264/445 |
| 5,314,568 | 5/1994 | Ryan | 156/504 |
| 5,415,722 | 5/1995 | Yeh | 156/512 |
| 5,853,529 | 12/1998 | Yeh | 156/512 |

*Primary Examiner*—James Sells
*Attorney, Agent, or Firm*—Alan Kamrath; Oppenheimer Wolff & Donnelly LLP

[57] ABSTRACT

A machine for fusing plastic plates includes a frame and a movable table mounted to the front end of the frame and movable along a longitudinal direction of the frame. Two spaced screw driving devices are secured to the underside of the movable table. Two screw rods are provided and each has a first end fixed to the frame and a second threaded end coupled to an associated screw driving device. The screw driving devices are driven to urge the movable table to move along the longitudinal direction of the frame. A rear compressing device is mounted behind the movable table for clamping a first plastic plate. A front compressing plate that is movable in a vertical direction is provided so as to cooperate with the movable table for clamping a second plastic plate. A fusion blade is provided for fusing a front end face of the second plastic plate with a rear end face of the first plastic plate. The front compressing plate further includes a fixed seat mounted thereon. A cylinder is attached to the fixed seat and has a piston rod. A guide plate is secured to the piston rod to move therewith. The guide plate is movable in a horizontal direction upon actuation of the cylinder to abut against the rear end face of the second plastic plate before fusion of the first plastic plate and the second plastic plate, thereby adjusting position of the rear end face of the first plastic plate.

2 Claims, 12 Drawing Sheets

MACHINE FOR FUSING PLASTIC PLATES WITH A GUIDING/POSITIONING FUNCTION

BACKGROUND OF THE INVENTION

1. Field of the Invention

The present invention relates to a machine for fusing plastic plates with a guiding/positioning function.

2. Description of the Related Art

Applicant's U.S. patent application Ser. No. 08/938,861 filed on Sep. 26, 1997, U.S. Pat. No. 5,853,529 discloses a machine for cutting and fusing plastic plates of polyethylene (PE) or ethylene vinyl acetate (EVA). The machine includes a movable table for supporting plastic plates, wherein the movable table is actuated by two pneumatic cylinders the displacements of which cannot be precisely controlled in response to plastic plates having different hardness. In addition, if any one of the pneumatic cylinders has a leakage or insufficient pressure, the piston rods cannot provide sufficient compressing force to retain the material plates in place. Thus, the piston rods cannot exert balanced forces to the material plates. As a result, the fusing result is unsatisfactory.

The present invention is intended to provide a machine with a guiding/positioning function that mitigates and/or obviates the above problems.

SUMMARY OF THE INVENTION

It is a primary object of the present invention to provide a machine for fusing plastic plates, wherein horizontal displacement of the movable table for supporting plastic plates is actuated by screw driving devices instead of pneumatic cylinders.

A machine for fusing plastic plates in accordance with the present invention comprises:

- a frame having a front end and a rear end,
- a movable table mounted to the front end of the frame and movable along a longitudinal direction of the frame, the movable table having an underside,
- a rear compressing device mounted behind the movable table for clamping a first plastic plate with a rear end face,
- a front compressing plate movable in a vertical direction, the front compressing plate and the movable table together clamping a second plastic plate with a front end face,
- a fusion blade for fusing the front end face of the second plastic plate with the rear end face of the first plastic plate,
- the front compressing plate further including a fixed seat mounted thereon, a cylinder being attached to the fixed seat and having a piston rod, a guide plate being secured to the piston rod to move therewith, the guide plate being movable in a horizontal direction upon actuation of the cylinder to abut against the rear end face of the second plastic plate before fusion of the first plastic plate and the second plastic plate, thereby adjusting position of the rear end face of the first plastic plate, and further comprising:
  - two spaced screw driving devices secured to the underside of the movable table,
  - two screw rods each having a first end fixed to the frame and a second threaded end coupled to an associated said screw driving device, and
  - means for driving the screw driving devices to urge the movable table to move along the longitudinal direction of the frame when the first plastic plate and the second plastic plate are tightly clamped, such that the front end face of the second plastic plate and the rear end face of the first plastic plate are in a tight contact before fusion by the fusion blade.

In a preferred embodiment of the invention, the means for driving the screw driving devices includes a link connected between the screw driving devices, a first chain wheel mounted on the link to rotate therewith, a motor with a second chain wheel on an output shaft thereof, and a chain wheel wound around the first chain wheel and the second chain wheel.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
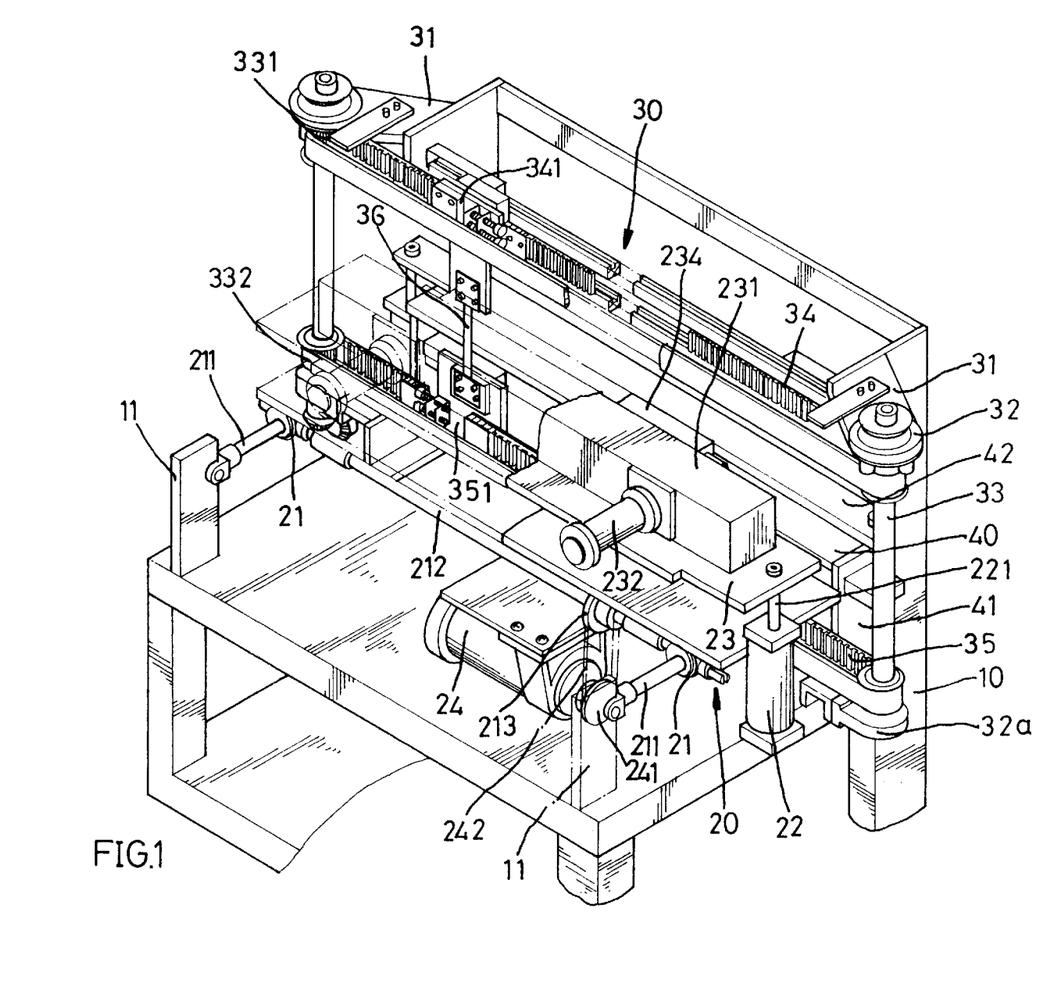
FIG. 1 is a perspective view of a machine for fusing plastic plates in accordance with the present invention.
Figure 2:
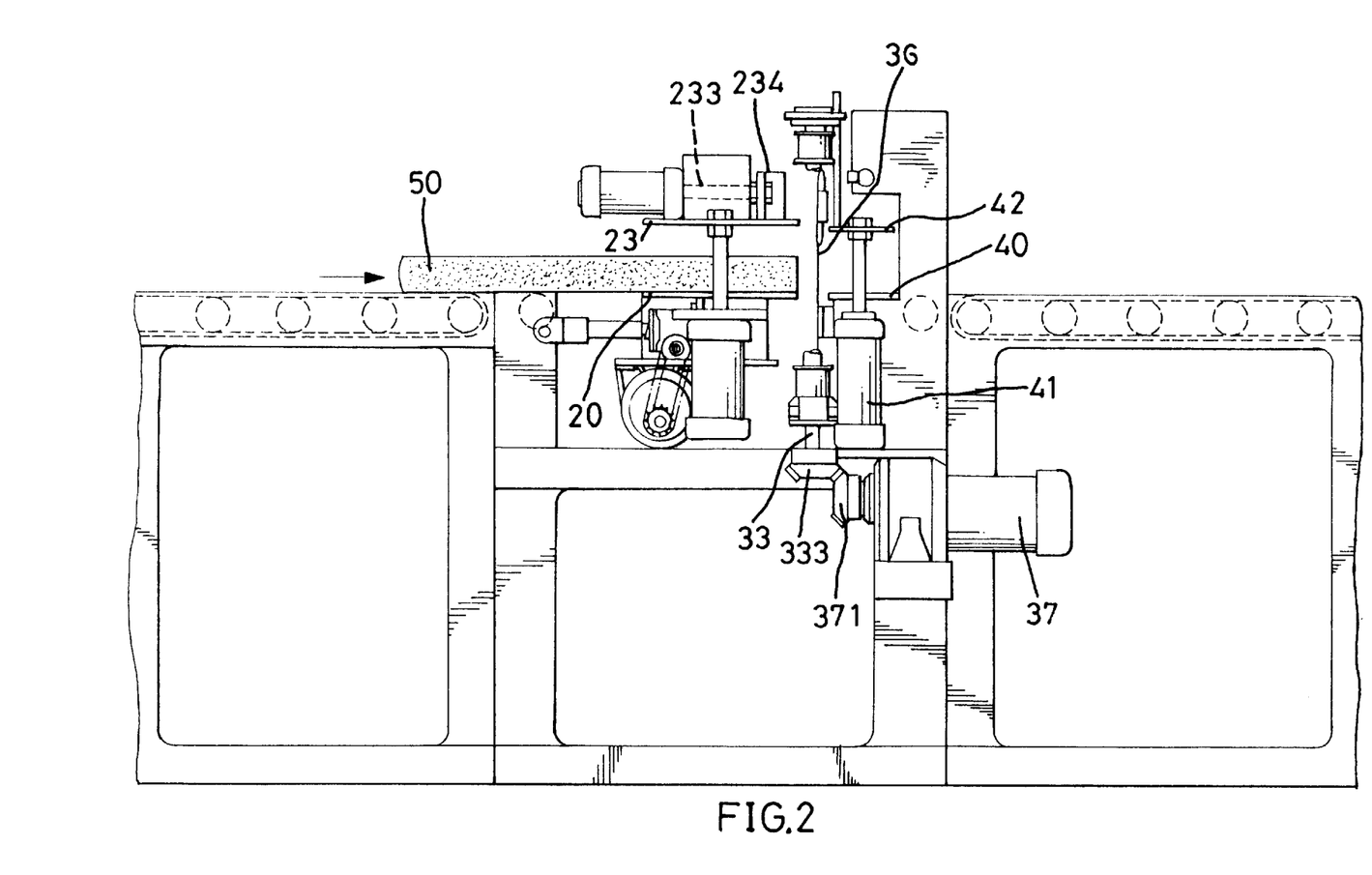
FIG. 2 is a side view illustrating operation of the machine, wherein a first plastic plate is fed to a movable table.

Referring to FIGS. 1 and 2, a machine for fusing plastic plates in accordance with the present invention generally includes a frame 10 and a movable table 20 movably mounted to a front end of the frame 10. Two spaced screw driving devices 21 are mounted to an underside of the movable table 20. Two screw rods 211 are provided and each of which includes a first end secured to a member 11 fixed to the frame 10 and a second threaded end coupled with an associated screw driving devices 21. A link 212 is connected between the two screw driving devices 21. In addition, a chain wheel 213 is mounted to the link 212 to rotate therewith. A motor 24 is provided below the movable table 20 and includes a chain wheel 241 on an output shaft (not labeled) thereof. A chain 242 is wound around the chain wheels 242 and 213. Thus, the movable table 20 can be moved in a longitudinal direction of the frame 10 when the motor 24 operates.

A vertical pneumatic cylinder 22 is mounted on each of two lateral sides of the frame 10 and has a piston rod 221. A front compressing plate 23 is connected to the piston rods 221. Thus, the front compressing plate 23 is movable in a vertical direction when the cylinders 22 are actuated. A fixed seat 231 is secured on the front compressing plate 23. A cylinder 232 is secured to the fixed seat 231 and includes a piston rod 233 that extends through the fixed seat 231 (FIG. 2). A guide plate 234 is attached to the piston rod 233 to move therewith. Thus, the guide plate 234 is movable in a horizontal direction when the cylinder 23 is actuated.

A fusing means 30 is provided behind the movable table 20. The fusing means 30 includes a supporting member 31 on each lateral side of the frame 10. Each supporting member 31 includes an upper extension plate 32 and a lower extension plate 32a. Each plate 32, 32a has a bearing (not shown) mounted therein for rotatably supporting a shaft 33. Each shaft 32 has an upper toothed belt pulley wheel 331 and a lower toothed belt pulley wheel 332. An upper toothed belt 34 is wound around the two upper toothed belt pulley wheels 331, and a lower toothed belt 35 is wound around the two lower toothed belt pulley wheels 332. Each toothed belt 34 includes a blade carrier 341, 351 secured thereto, and a fusion blade 36 is secured between the blade carriers 341 and 351. Referring to FIG. 2, a motor 37 is mounted to the frame 10 and includes a bevel gear 371 provided on an output shaft (not labeled) thereof. A bevel gear 333 is mounted to the shaft 33 to rotate therewith. The bevel gear 333 meshes with bevel gear 371 such that the shaft 33 is rotated when the motor 37 operates, thereby moving the fusion blade 36 along a direction transverse to a longitudinal direction of the plastic plates to be fused.

Referring to FIGS. 1 and 2, a rear compressing table 40 is mounted behind the fusion means 30. Two pneumatic cylinders 41 are provided on both sides of the rear compressing table 40. A rear compressing plate 42 is attached to piston rods (not labeled) of the cylinder 41 so as to be movable in the vertical direction when the cylinders 41 are actuated.

It is appreciated that the machine in accordance with the present invention can be incorporated into another machine so as to automatically or manually feed plastic plates into the machine for fusion. Operation of the machine is described as follows.

Figure 3:
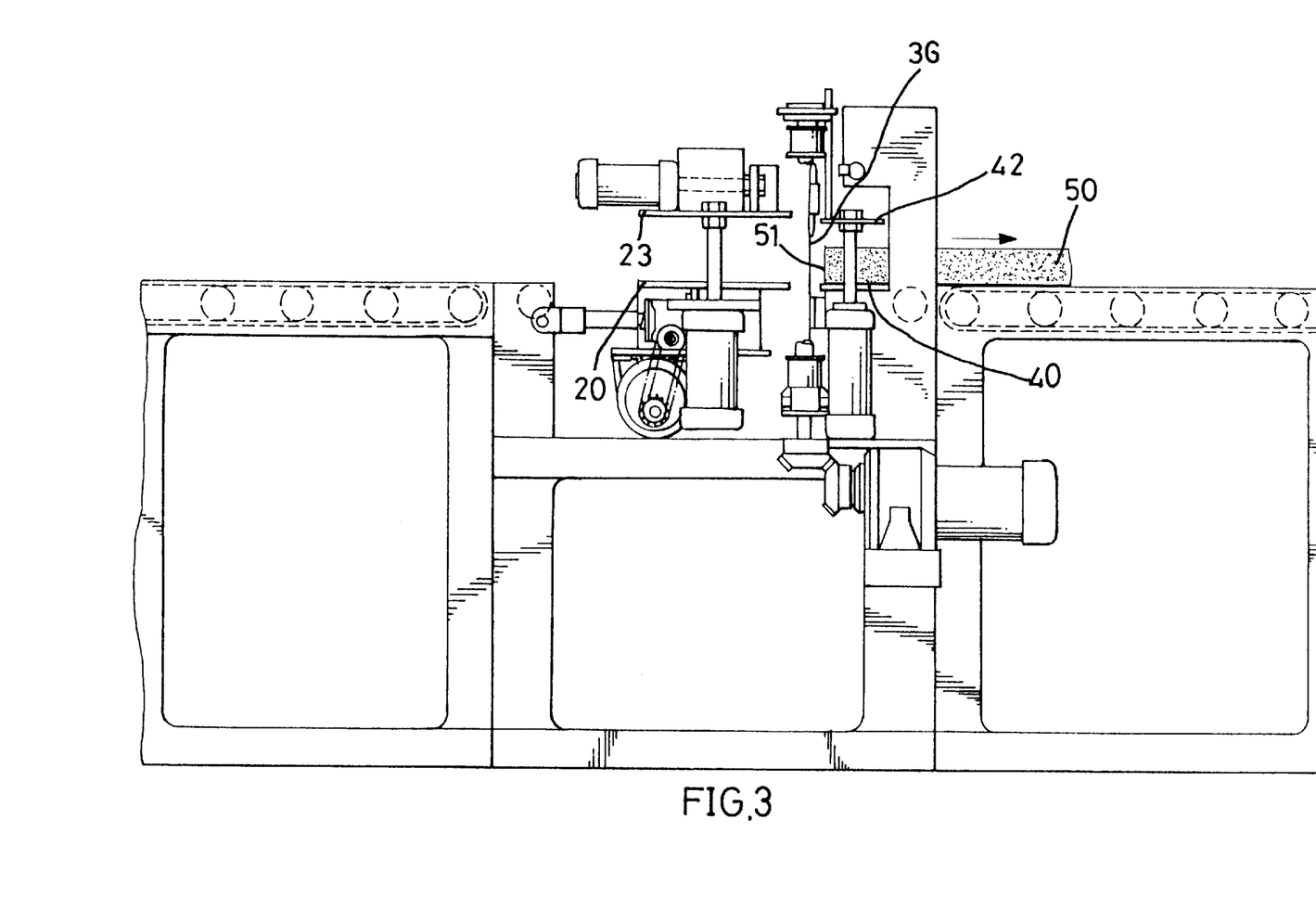
FIG. 3 is a side view similar to FIG. 2, wherein the first plastic plate is moved to a rear compressing table.
Figure 4:
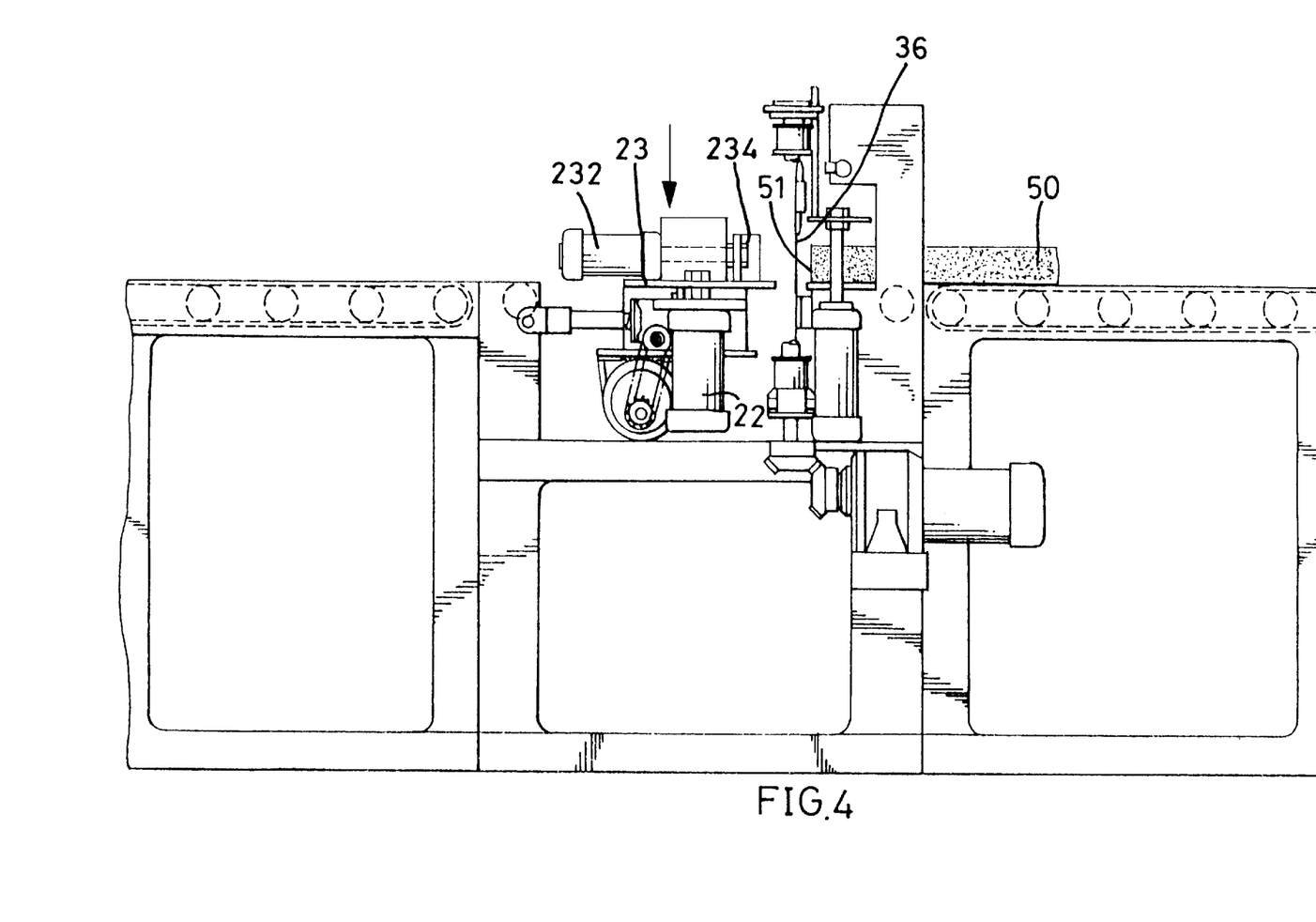
FIG. 4 is a side view similar to FIG. 3, wherein a front compressing plate is lowered.
Figure 5:
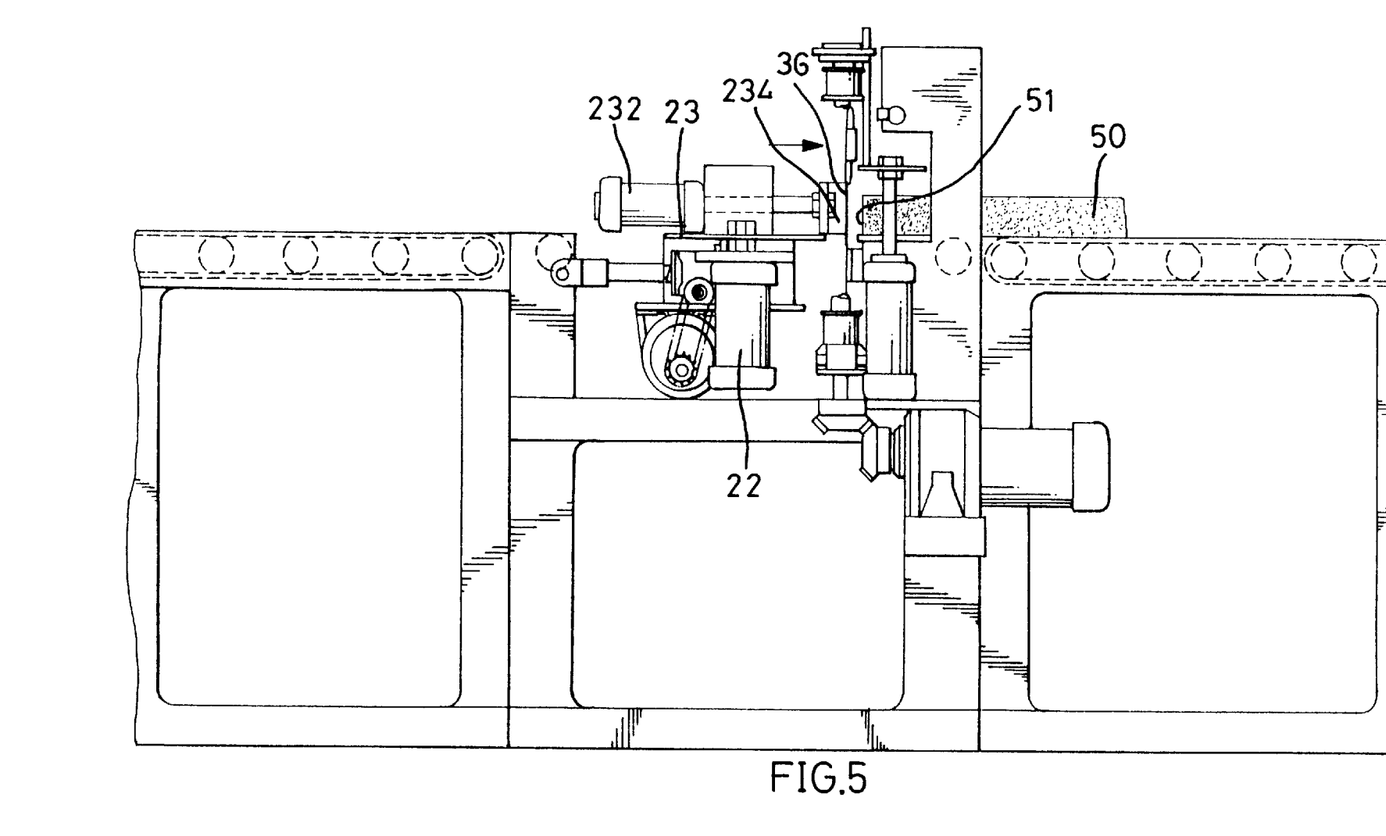
FIG. 5 is a side view similar to FIG. 4, wherein the front compressing plate is moved toward the first plastic plate such that a guide plate abuts against a rear end of the first plastic plate.
Figure 6:
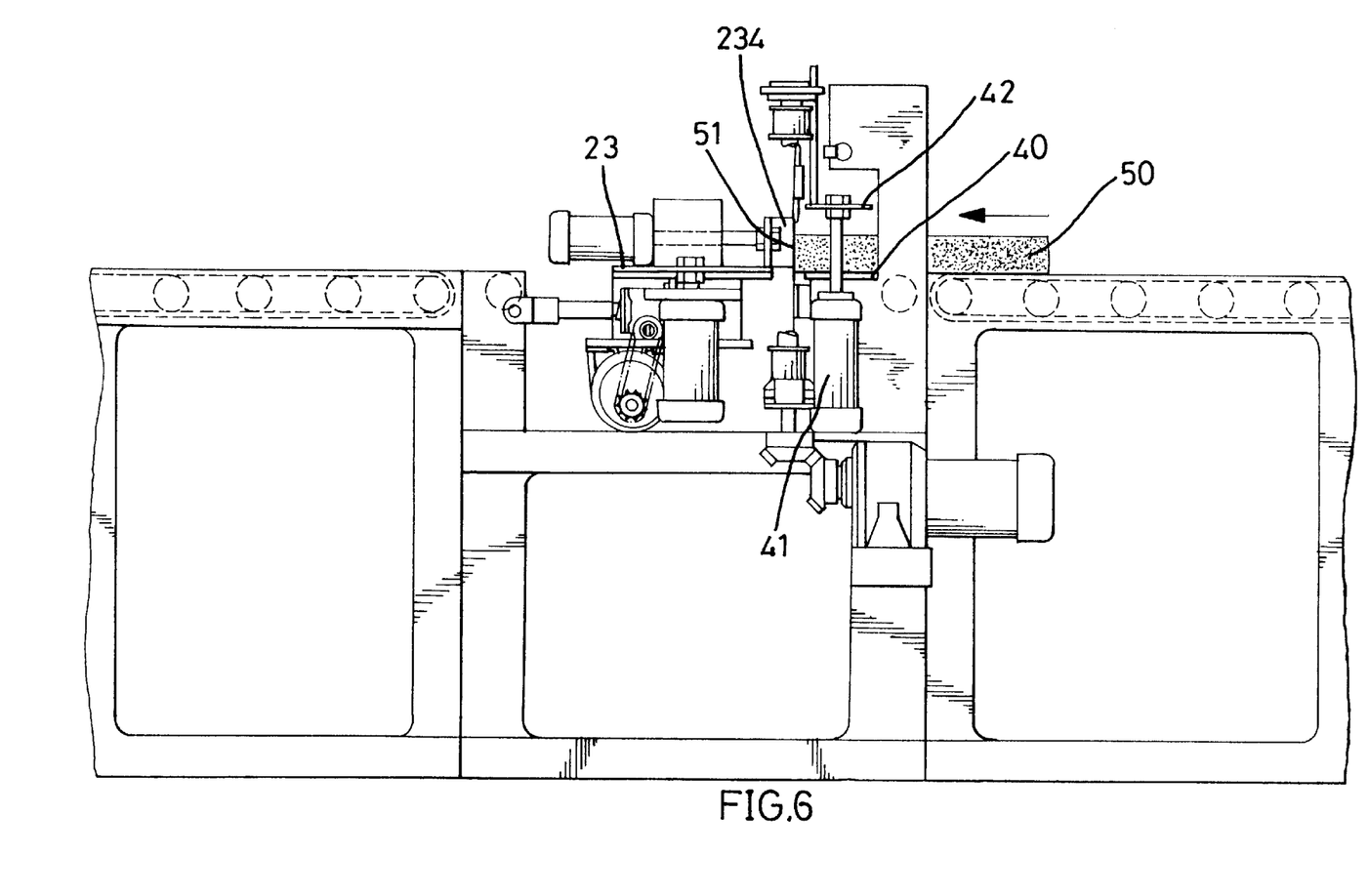
FIG. 6 is a side view similar to FIG. 5, wherein the first plastic plate is moved to bear against the guide plate to thereby adjust position of the rear end of the first plastic plate.

Referring to FIG. 2, a first plastic plate 50 is fed to the movable table 20 and then to the fixed rear compressing table 40, as shown in FIG. 3. Then, the front compressing plate 23 is lowered upon actuation of the cylinders 22, as shown in FIG. 4. Next, referring to FIG. 5, the front compressing plate 23 is moved toward the first plastic plate 50 such that the guide plate 234 abuts against a rear end face 51 of the first plastic plate 50. Namely, the end face of the guide plate 234 is flush with the fusion blade 36. Referring next to FIG. 6, the first plastic plate 50 is moved backwards such that the rear end face 51 of the first plastic plate 50 bears against the guide plate 234 to thereby adjust position of the rear end face 51 of the first plastic plate 50 to be flush with the fusion blade 36.

Figure 7:
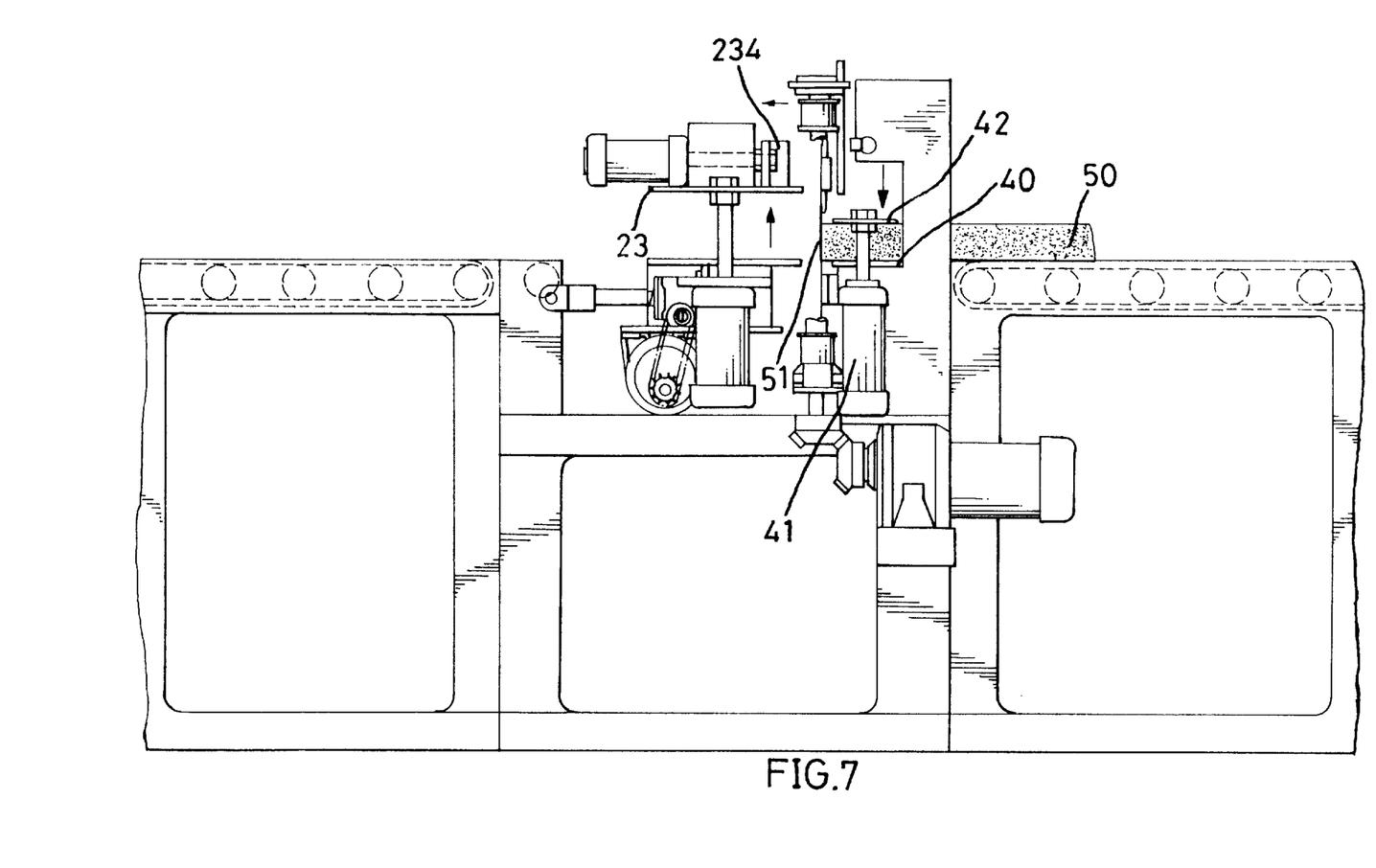
FIG. 7 is a side view similar to FIG. 6, wherein the front compressing plate is elevated.
Figure 8:
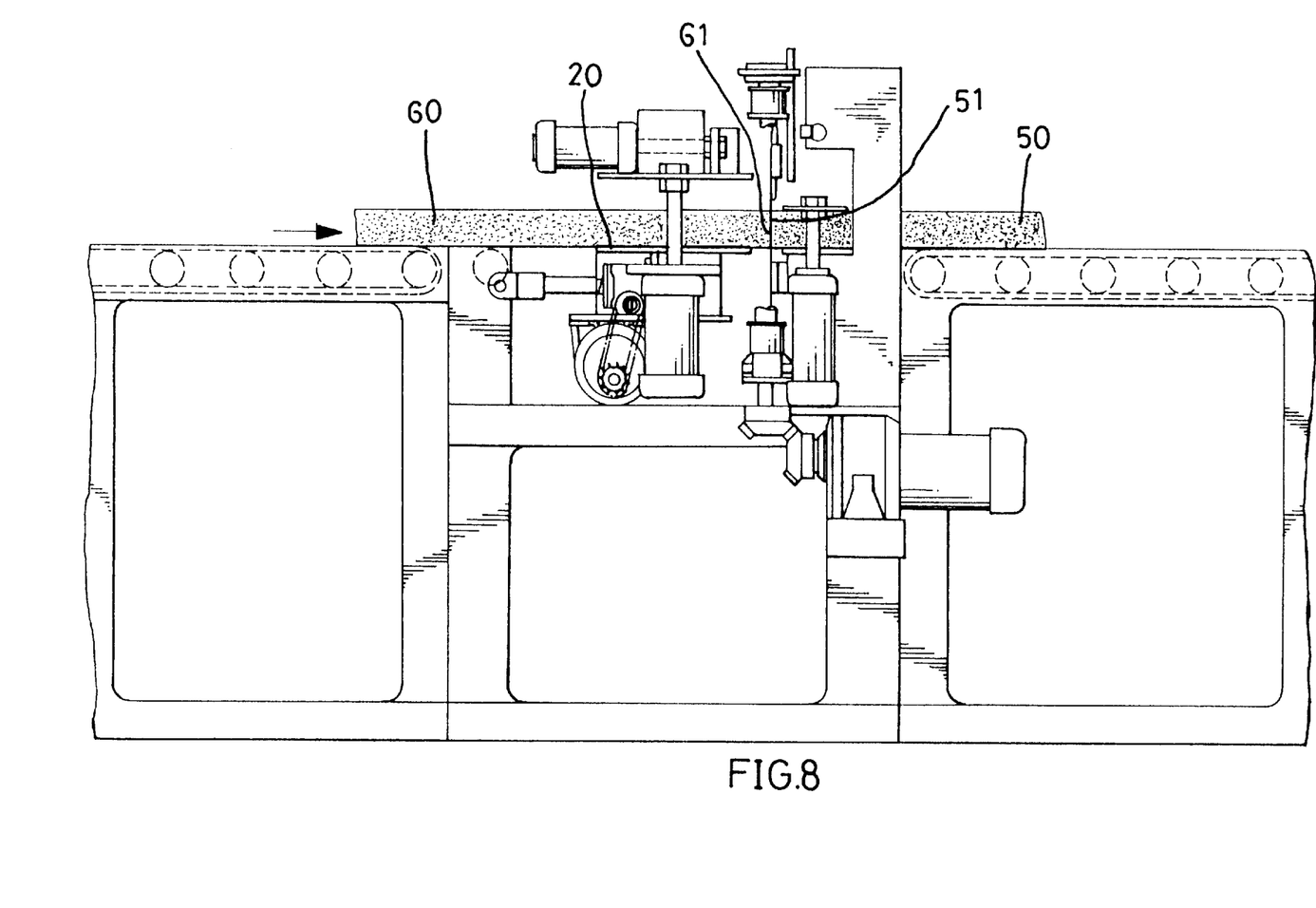
FIG. 8 is a side view similar to FIG. 7, wherein a second plastic plate is fed to the movable table and abuts against with the first plastic plate.
Figure 9:
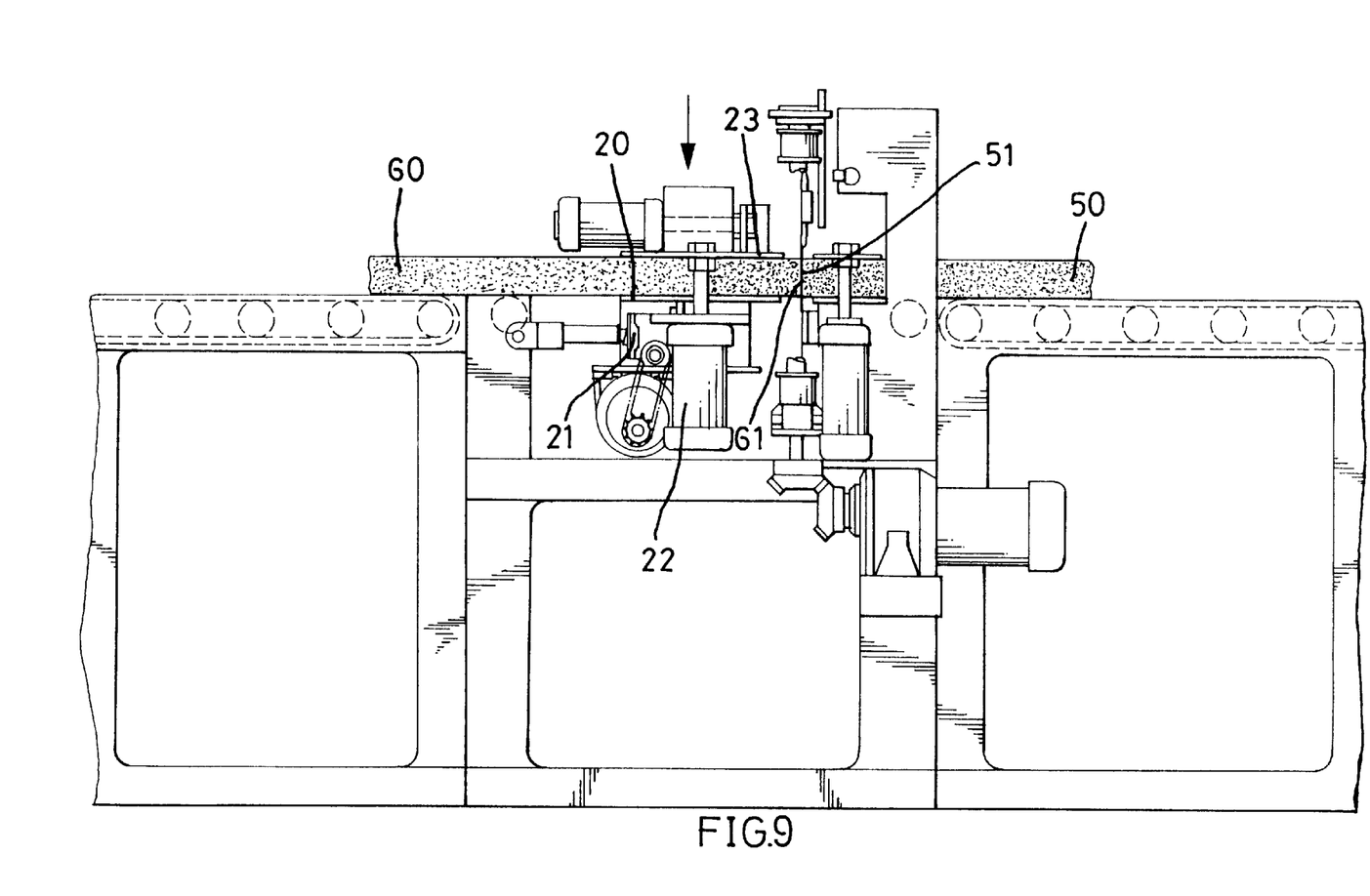
FIG. 9 is a side view similar to FIG. 8, wherein the front compressing plate is lowered to tightly clamp the second plastic plate.
Figure 10:
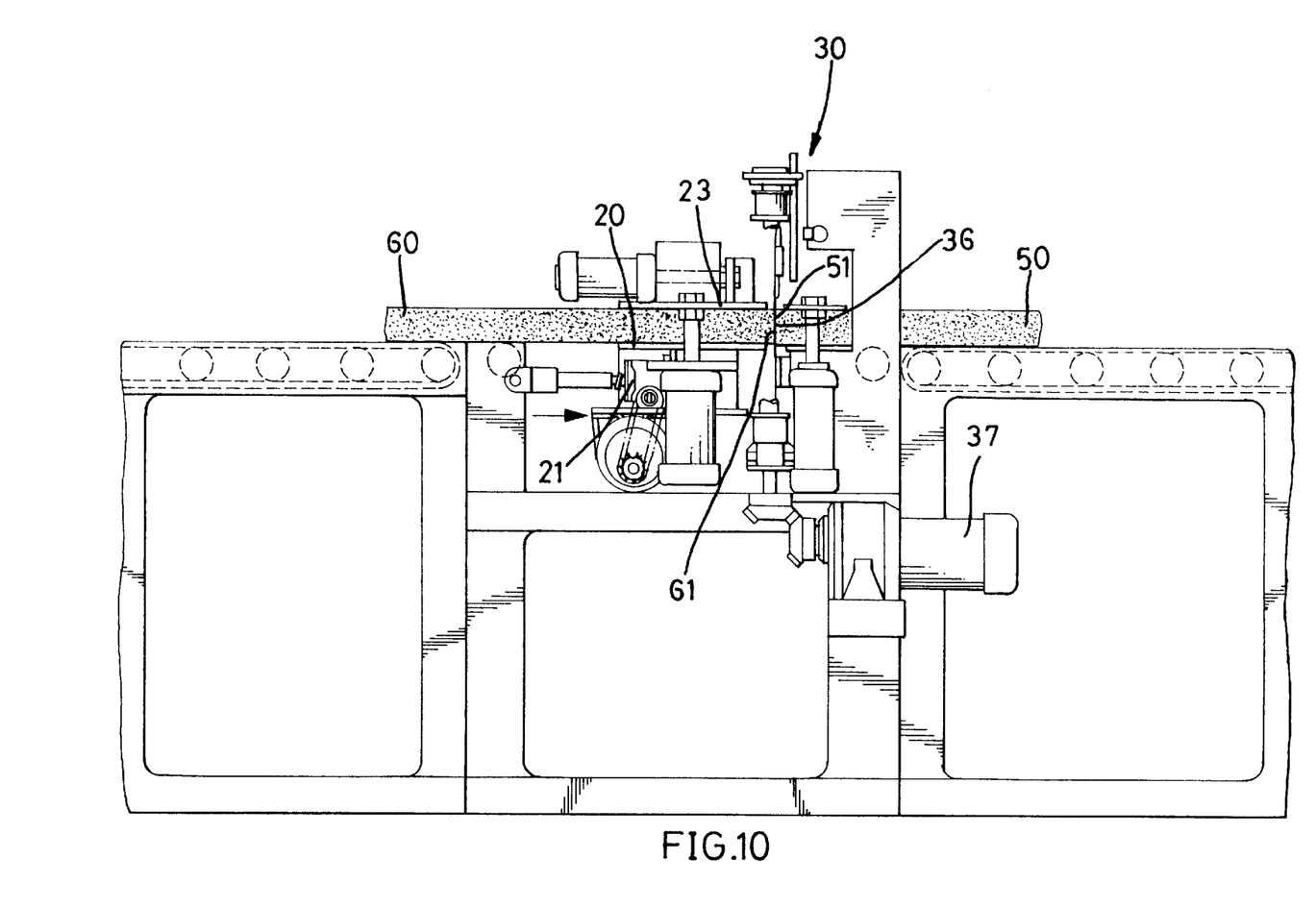
FIG. 10 is a side view similar to FIG. 9, wherein the movable table is moved toward the first plastic plate to make a tight contact between the first and second plastic plates.
Figure 11:
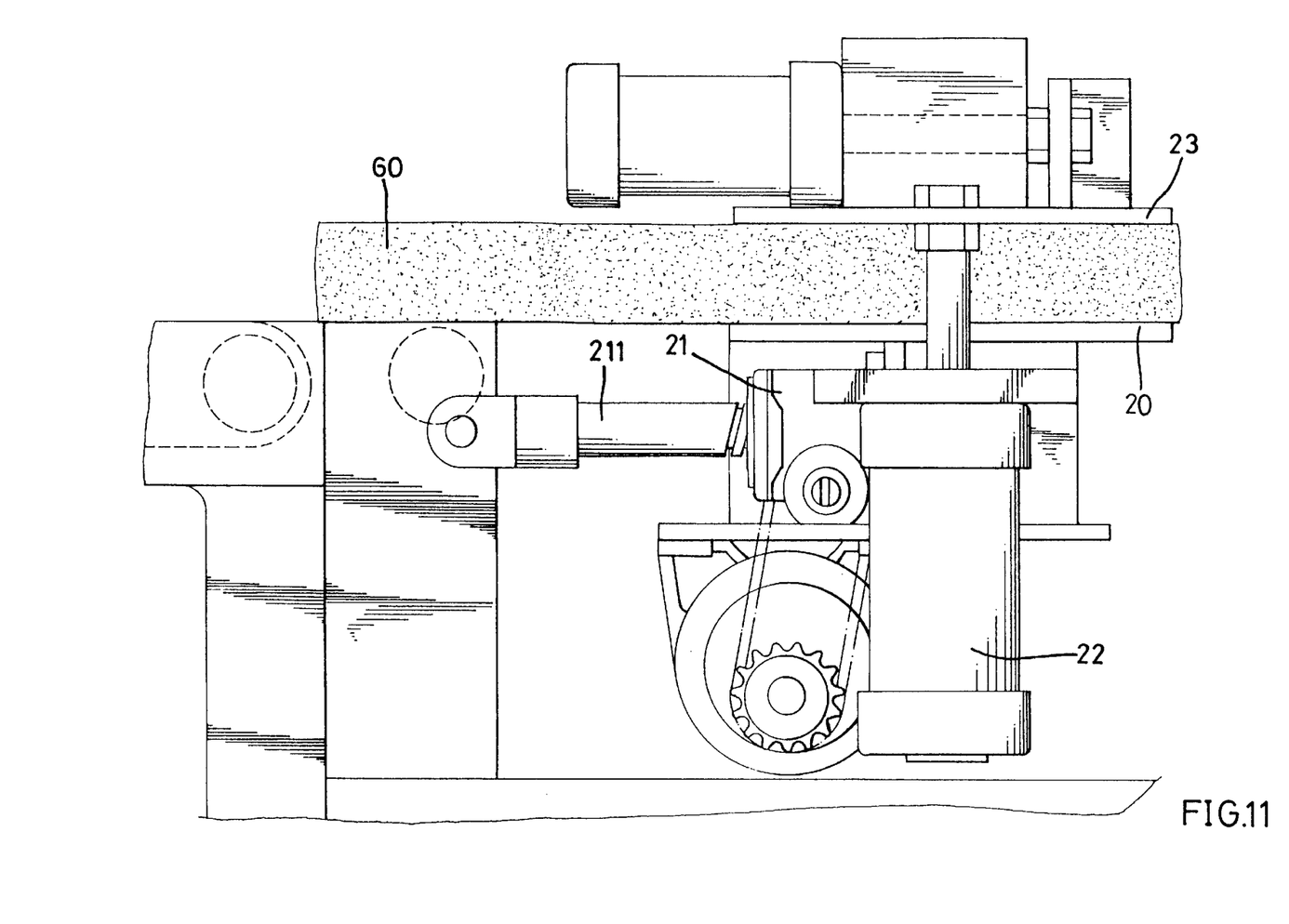
FIG. 11 is an enlarged view of a portion of the machine in FIG. 9.
Figure 12:
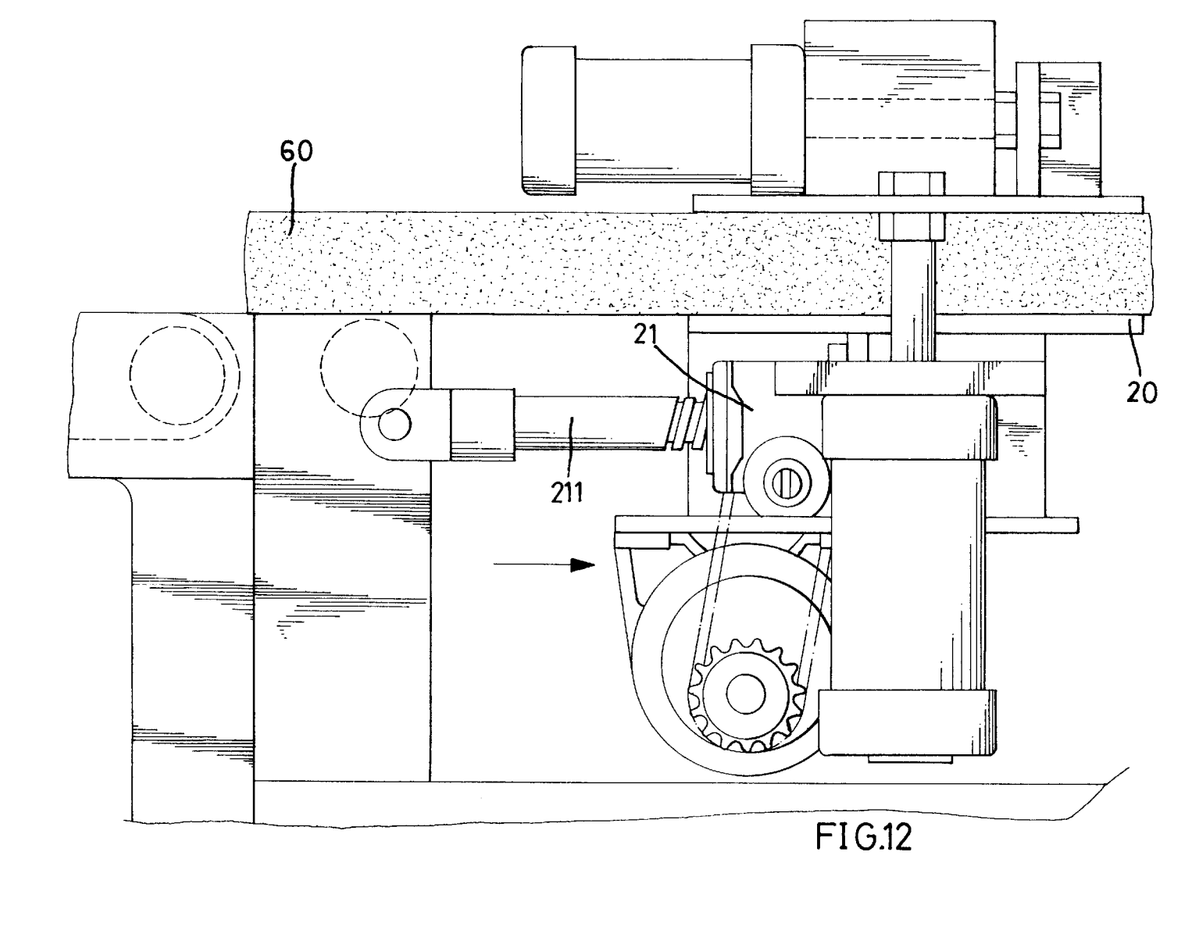
FIG. 12 is an enlarged view of a portion of the machine in FIG. 10.

Then, the rear compressing plate 42 is lowered to tightly clamp the first plastic plate 50, the guide plate 234 is moved away from the first plastic plate 50, and the front compressing plate 23 is elevated, as shown in FIG. 7. Next, referring to FIG. 8, a second plastic plate 60 is fed to the movable table 20 such that the front end face 61 of the second plastic plate 60 abuts against the rear end face 51 of the first plastic plate 50. Next, referring to FIG. 9, the front compressing plate 23 is lowered to tightly clamp the second plastic plate 60. Then, referring to FIG. 10, the movable table 20 is slightly moved toward the first plastic plate 50 such that the front end face 61 of the second plastic plate 60 and the rear end face 51 of the first plastic plate 50 are slightly squeezed to assure a reliable tight contact therebetween the first and second plastic plates 50 and 60. Then, the fusion blade 36 may be actuated by the motor 37 to move across the contact surface between the plastic plates 50 and 60 to fuse them together, which is conventional and therefore not described in detail. FIGS. 11 and 12 are enlarged views illustrating the horizontal displacement of the movable table 20. It is appreciated that the displacement of the movable table 20 can be controlled precisely by means of controlling the turns of the screw rods 211.

Referring to the above description, it is appreciated that the plastic plates 50 and 60 are in a reliable tight contact during fusion due to provision of the screw driving devices 21. Displacement of the movable table 20 can be precisely controlled in response to plastic plates of different hardness, thereby providing a better fusion result. In addition, the screw driving devices 21 apply forces of identical magnitude to both sides of the movable table 20 to further assure better fusion result.

Although the invention has been explained in relation to its preferred embodiment, it is to be understood that many other possible modifications and variations can be made without departing from the spirit and scope of the invention as hereinafter claimed.

What is claimed is:

1. A machine for fusing plastic plates, comprising:
    a frame (10) having a front end and a rear end,
    a movable table (20) mounted to the front end of the frame and movable along a longitudinal direction of the frame, the movable table (20) having an underside,
    a rear compressing device (40, 42) mounted behind the movable table (20) for clamping a first plastic plate (50) with a rear end face (51),
    a front compressing plate (23) movable in a vertical direction, the front compressing plate and the movable table together clamping a second plastic plate (60) with a front end face (61),
    a fusion blade (36) for fusing the front end face of the second plastic plate with the rear end face of the first plastic plate,
    the front compressing plate (23) further including a fixed seat (231) mounted thereon, a cylinder (232) being attached to the fixed seat (231) and having a piston rod (233), a guide plate (234) being secured to the piston rod (233) to move therewith, the guide plate (234) being movable in a horizontal direction upon actuation of the cylinder (232) to abut against the rear end face of the second plastic plate before fusion of the first plastic plate and the second plastic plate, thereby adjusting position of the rear end face (51) of the first plastic plate (50), and further comprising:

two spaced screw driving devices (21) secured to the underside of the movable table, two screw rods (211) each having a first end fixed to the frame and a second threaded end coupled to an associated said screw driving device (21), means (24) for driving the screw driving devices (21) to urge the movable table (20) to move along the longitudinal direction of the frame when the first plastic plate (50) and the second plastic plate (60) are tightly clamped, such that the front end face (61) of the second plastic plate (60) and the rear end face (51) of the first plastic plate (50) are in a tight contact before fusion by the fusion blade (36).

2. The machine for fusing plastic plates as claimed in claim 1, wherein the means for driving the screw driving devices (21) includes a link (212) connected between the screw driving devices, a first chain wheel (213) mounted on the link to rotate therewith, a motor (24) with a second chain wheel (241) on an output shaft thereof, and a chain wheel (242) wound around the first chain wheel (213) and the second chain wheel (241).

* * * * *